US012596054B2

(12) United States Patent
Wang et al.

(10) Patent No.: US 12,596,054 B2
(45) Date of Patent: Apr. 7, 2026

(54) MEASURING DEVICE FOR LATERAL OPTICAL FIBER LENS AND MEASURING METHOD USING SAME

(71) Applicant: SUZHOU MICROPORT ARGUS MEDICAL CORP, Jiangsu (CN)

(72) Inventors: Zhengyi Wang, Jiangsu (CN); Zhenying Wu, Jiangsu (CN); Lintao Zhang, Jiangsu (CN)

(73) Assignee: SUZHOU MICROPORT ARGUS MEDICAL CORP, Jiangsu (CN)

( * ) Notice: Subject to any disclaimer, the term of this patent is extended or adjusted under 35 U.S.C. 154(b) by 240 days.

(21) Appl. No.: 18/283,955

(22) PCT Filed: Mar. 10, 2022

(86) PCT No.: PCT/CN2022/080177
§ 371 (c)(1),
(2) Date: Sep. 25, 2023

(87) PCT Pub. No.: WO2022/199397
PCT Pub. Date: Sep. 29, 2022

(65) Prior Publication Data
US 2024/0167912 A1 May 23, 2024

(30) Foreign Application Priority Data
Mar. 25, 2021 (CN) .......................... 202110319929.0

(51) Int. Cl.
*G01M 11/02* (2006.01)

(52) U.S. Cl.
CPC .............................. *G01M 11/0207* (2013.01)

(58) Field of Classification Search
CPC .. G01M 11/0207; G01M 11/35; G01M 11/02; G06T 2211/456; G06T 2207/10101; G06T 11/003
See application file for complete search history.

(56) References Cited

U.S. PATENT DOCUMENTS

| | | | | |
|---|---|---|---|---|
| 2004/0258370 A1* | 12/2004 | Bush | .................... | G02B 6/2551 385/97 |
| 2018/0143245 A1* | 5/2018 | Saadany | ................ | G01R 1/071 |
| 2021/0055340 A1* | 2/2021 | Hsu | .................... | G01R 31/2656 |

FOREIGN PATENT DOCUMENTS

| | | |
|---|---|---|
| CN | 1635354 | 7/2005 |
| CN | 103645471 | 3/2014 |

(Continued)

OTHER PUBLICATIONS

CN109163884A translation with line numbers (Year: 2019).*

(Continued)

*Primary Examiner* — Tarifur R Chowdhury
*Assistant Examiner* — Carlos Perez-Guzman
(74) *Attorney, Agent, or Firm* — WENDEROTH, LIND & PONACK, L.L.P.

(57) ABSTRACT

Disclosed are a measuring device for a lateral optical fiber lens, the measuring device comprising an XZ movable platform and an XY movable platform, wherein a rotatable accommodating pipe is arranged on the XZ movable platform, an optical detection card is arranged on the XY movable platform, an optical power probe is arranged below the optical detection card, and the optical detection card has a height smaller than that of the accommodating pipe. The present application further provides a method for measuring a light emergence angle and a divergence angle of a lateral optical fiber lens by using the measuring device for a lateral optical fiber lens. By means of the measuring device for the lateral optical fiber lens provided in the present application, a light emergence angle and a divergence angle of a lateral optical fiber lens can be measured, a fiber lens can be rotated by means of the accommodating pipe, the position and the level of the fiber lens can be adjusted by means of the XZ movable platform, and therefore a light emergence direction of the fiber lens is changed. Then, by utilizing the charac- (Continued)

Optical Power Probe teristics of a high monochromaticity, high directivity etc. of a laser, a point of projection of a light spot is positioned by means of the optical detection card and the optical power probe, and the light emergence angle and the divergence angle are measured.

14 Claims, 2 Drawing Sheets

(56)                    References Cited

FOREIGN PATENT DOCUMENTS

| CN | 106500964 | 3/2017 |
|----|-----------|--------|
| CN | 206818387 | 12/2017 |
| CN | 109163884 | 1/2019 |
| CN | 109323653 | 2/2019 |
| CN | 110082076 | 8/2019 |
| CN | 111912602 | 11/2020 |
| CN | 113029527 | 6/2021 |
| CN | 214407975 | 10/2021 |
| JP | 2002-5788 | 1/2002 |
| JP | 2005-233875 | 9/2005 |

OTHER PUBLICATIONS

CN110082076A translation with line numbers (Year: 2019).*
International Search Report issued May 20, 2022, by the China National Intellectual Property Administration as the ISA, in International (PCT) Application No. PCT/CN2022/080177.

* cited by examiner

Optical Power Probe

MEASURING DEVICE FOR LATERAL OPTICAL FIBER LENS AND MEASURING METHOD USING SAME

TECHNICAL FIELD

The present application relates to the field of optical fiber technology, in particular to a measuring device for lateral optical fiber lens and a measuring method using the same.

BACKGROUND ART

Optical coherence tomography (OCT) is a new type of tomographic imaging technology that has developed rapidly in recent years and has the most promising prospects, especially in the detection and imaging of biological tissues. It has been tried to be applied in the clinical diagnosis of cardiology, ophthalmology, dentistry and dermatology. It is another major technological breakthrough after X-CT and MRI technology, and has developed rapidly in recent years. Optical interference tomography system based on this technology enables to obtain ultra-high-definition images with micron-level spatial resolution. The imaging catheter used for scanning of the optical interference tomography system is often based on the lateral optical fiber lens. At the same time, the measurement of key indicators such as the light-emitting angle and divergence angle of the lateral optical fiber lens has become an important subject in this technical field.

At present, there is no unified measuring device and measurement method for the light-emitting angle and divergence angle of the lateral optical fiber lens in the prior art. Therefore, one of the urgent issues to be solved in this field is to study a convenient, easy-to-operate and high-accuracy measurement method and device.

SUMMARY OF THE APPLICATION

In view of the above issue, the application provides a measuring device for a lateral optical fiber lens; wherein the measuring device is used to measure the light-emitting angle and divergence angle of the fiber lens, and the fiber lens is rotated and moved by the measuring device, thereby changing and moving the light-emitting direction of the fiber lens; then the light-emitting angle and the divergence angle are measured by utilizing the characteristics including high monochromaticity and high directivity of a laser, and positioning the point of projection of a light spot by means of special optical detection card.

The application provides the following technical solutions.

1. A measuring device for a lateral optical fiber lens, comprising an XZ movable platform and an XY movable platform; a rotatable accommodating pipe is arranged on the XZ movable platform, an optical detection card is arranged on the XY movable platform; and an optical power probe is arranged below the optical detection card; and the height of the optical detection card is smaller than that of the accommodating pipe.

2. The measuring device according to item 1, wherein a fixed base is further arranged between the XZ movable platform and the XY movable platform, and a slot is arranged on the fixed base, and the optical power probe is arranged in the slot.

3. The measuring device according to item 2, wherein a first end of the optical detection card is fixed on the XY movable platform, and a second end of the optical detection card is located above the slot;

and the XY movable platform has a rotary knob with a scale for recording the relative distance that the optical detection card moves along the X-axis direction and/or the Y-axis direction.

4. The measuring device according to item 2, wherein the optical detection card is a rectangular sheet, and a square identification region is located at the second end of the optical detection card and above the slot; and the area of the square identification region is not smaller than that of the detecting surface of the optical power probe.

5. The measuring device according to item 1, wherein the XZ movable platform comprises a fixed part, a control part and a lifting part; the control part is fixed on the fixed part, and the lifting part is retractable and arranged on the control part.

6. The measuring device according to item 5, wherein the lifting part is provided with a scale along the Z axis for recording the lifting height of the lifting part.

7. The measuring device according to item 5, wherein a through hole is provided at the top of the lifting part, the accommodating pipe passes through the through hole, and the accommodating pipe is arranged vertically to the lifting part.

8. The measuring device according to item 7, wherein the inner diameter of the through hole is larger than the outer diameter of the accommodating pipe.

9. The measuring device according to item 7, wherein the lifting part is further provided with a locking part for locking the accommodating pipe.

10. The measuring device according to any one of items 2-9, further comprising a bottom plate, wherein the XZ movable platform, the XY movable platform and the fixed base are all located on the bottom plate.

11. The measuring device according to item 10, wherein a scale is provided on the bottom plate for recording the relative distances of the XZ movable platform and the XY movable platform on the bottom plate.

12. A measurement method for measuring the light-emitting angle of a lateral optical fiber lens by the measuring device according to any one of items 1-11, comprising the steps of:

initializing the measuring device, wherein the initial position of the center of the fiber lens is $A_0$ $(0, 0, Z_0)$;

adjusting the XZ movable platform and/or the accommodating pipe to drive the fiber lens to move and/or rotate until the projection of the fiber lens on the optical detection card does not exceed the square identification region, and when the center of the light spot projection on the optical detection card is located at the center O of the square identification region, the adjustment of the XZ movable platform and/or accommodating pipe is stopped, and at this time the position of the fiber lens is $A_1$ $(X_1, 0, Z_1)$; and calculating the light-emitting angle ($\alpha$) of the fiber lens, $\alpha = |\arctan (X_1/Z_1)|$.

13. The measurement method according to item 12, wherein as for initializing the measuring device, the optical fiber is arranged in the accommodating pipe, and the fiber lens is facing the XY movable platform, and the projection of the fiber lens on the optical detection card is located at the center O of the square identification region, and the coordinates of O are $(0, 0, 0)$.

14. A measurement method for measuring the divergence angle of a lateral optical fiber lens by the measuring device according to any one of items 1-11, comprising the steps of:

initializing the measuring device, wherein the initial position of the center of the fiber lens is $A_0$ (0, 0, $Z_0$);

adjusting the XZ movable platform and/or the accommodating pipe to drive the fiber lens to move and/or rotate until the projection of the fiber lens on the optical detection card does not exceed the square identification region, and when the center of the light spot projection on the optical detection card is located at the center O of the square identification region, the adjustment of the XZ movable platform and/or accommodating pipe is stopped, and at this time the position of the fiber lens is $A_1(X_1, 0, Z_1)$;

adjusting the XY movable platform to drive the optical detection card to move along the first direction of the X axis, and observing the change of the indicated reading P of the optical power probe, when P reaches the maximum value $P_1$, the coordinates of O at this time $(X_2, 0, 0)$ are recorded;

adjusting the XY movable platform to drive the optical detection card to move along the second direction of the X axis, and observing the change of the indicated reading P of the optical power probe, when P reaches 0.5 $P_1$, the coordinates of O at this time $(X_3, 0, 0)$ are recorded;

initializing the measuring device;

adjusting the XY movable platform to drive the optical detection card to move along the first direction of the Y axis, and observing the change of the indicated reading P of the optical power probe, when P reaches the maximum value $P_1$, the coordinates of O at this time $(0, Y_2, 0)$ are recorded;

adjusting the XY movable platform to drive the optical detection card to move along the second direction of the Y axis, and observing the change of the indicated reading P of the optical power probe, when P reaches 0.5 $P_1$, the coordinates of O at this time $(0, Y_3, 0)$ are recorded; and calculating the divergence angle of the fiber lens:

$$\text{divergence angle } (OX) \ \beta \approx 2 \times \arctan \ [(\delta_x \cos \alpha)/\delta_L];$$

$$\text{divergence angle } (OY) \ \gamma = 2 \times \arctan \ [(\delta_y/\delta_L];$$

wherein, $\delta_x = |X_2 - X_3|$, $\delta_y = |Y_2 - Y_3|$, $\alpha = |\arctan (X_1/Z_1)|$, and $\delta_L = Z_1/\cos \alpha$.

15. A measurement method for measuring the divergence angle of a lateral optical fiber lens by the measuring device according to any one of items 1-11, comprising the steps of:

initializing the measuring device, wherein the initial position of the center of the fiber lens is $A_0$ (0, 0, $Z_0$);

adjusting the XZ movable platform and/or the accommodating pipe to drive the fiber lens to move and/or rotate until the projection of the fiber lens on the optical detection card does not exceed the square identification region, and when the center of the light spot projection on the optical detection card is located at the center O of the square identification region, the adjustment of the XZ movable platform and/or accommodating pipe is stopped, and at this time the position of the fiber lens is $A_1(X_1, 0, Z_1)$;

adjusting the XY movable platform to drive the optical detection card to move along the first direction of the X axis, and observing the change of the indicated reading P of the optical power probe, when P reaches the maximum value $P_1$, the coordinates of O at this time $(X_2, 0, 0)$ are recorded;

adjusting the XY movable platform to drive the optical detection card to move along the second direction of the X axis, and observing the change of the indicated reading P of the optical power probe, when P reaches 0.5 $P_1$, the coordinates of O at this time $(X_3, 0, 0)$ are recorded; initializing the measuring device;

adjusting the XY movable platform to drive the optical detection card to move along the first direction of the Y axis, and observing the change of the indicated reading P of the optical power probe, when P reaches the maximum value $P_1$, the coordinates of O at this time $(0, Y_2, 0)$ are recorded;

adjusting the XY movable platform to drive the optical detection card to move along the second direction of the Y axis, and observing the change of the indicated reading P of the optical power probe, when P reaches 0.5 $P_1$, the coordinates of O at this time $(0, Y_3, 0)$ are recorded;

adjusting the XZ movable platform and/or the accommodating pipe to drive the fiber lens to move and/or rotate until the projection of the fiber lens on the optical detection card does not exceed the square identification region, and when the center of the light spot projection on the optical detection card is located at the center O of the square identification region, the adjustment of the XZ movable platform and/or accommodating pipe is stopped, and at this time the position of the fiber lens is $A_4$ $(X_4, 0, Z_4)$;

adjusting the XY movable platform to drive the optical detection card to move along the first direction of the X axis, and observing the change of the indicated reading P of the optical power probe, when P reaches the maximum value $P_1$, the coordinates of O at this time $(X_5, 0, 0)$ are recorded;

adjusting the XY movable platform to drive the optical detection card to move along the second direction of the X axis, and observing the change of the indicated reading P of the optical power probe, when P reaches 0.5 $P_1$, the coordinates of O at this time $(X_6, 0, 0)$ are recorded; initializing the measuring device;

adjusting the XY movable platform to drive the optical detection card to move along the first direction of the Y axis, and observing the change of the indicated reading P of the optical power probe, when P reaches the maximum value $P_1$, the coordinates of O at this time $(0, Y_5, 0)$ are recorded;

adjusting the XY movable platform to drive the optical detection card to move along the second direction of the Y axis, and observing the change of the indicated reading P of the optical power probe, when P reaches 0.5 $P_1$, the coordinates of O at this time $(0, Y_6, 0)$ are recorded; and calculating the divergence angle of the fiber lens:

$$\text{divergence angle } (OX) \ \beta \approx 2 \times \arctan \ [(|\delta_x - \Delta x| \times \cos \alpha)/\Delta d];$$

$$\text{divergence angle } (OY) \ \gamma = 2 \times \arctan \ [(|\delta_y - \Delta y|/\Delta d];$$

wherein $\delta_x = |X_2 - X_3|$, $\delta y = |Y_2 - Y_3|$, $\Delta x = |X_5 - X_6|$, $\Delta y = |Y_5 - Y_6|$, $\Delta z = |Z_1 - Z_4|$, $\Delta d = \Delta z/\cos \alpha$, $\alpha = |\arctan (X_4/Z_4)|$.

16. The measurement method according to item 14 or 15, wherein as for initializing the measuring device, the optical fiber is arranged in the accommodating pipe, the fiber lens is facing the XY movable platform, and the projection of the fiber lens on the optical detection card is located at the center O of the square identification region.

17. The measurement method according to item 14 or 15, wherein the first direction of the X-axis is a direction away from the XZ movable platform, that is, the first direction of the X-axis is the negative direction of the X-axis; the second direction of the X-axis is opposite to the first direction, that is, the second direction of the X-axis is the positive direction of the X-axis;

the first direction of the Y axis is the negative direction of the Y axis, and the second direction of the Y axis is the positive direction of the Y axis.

The measuring device of the lateral optical fiber lens provided by the application can be used to measure the light-emitting angle and the divergence angle of a lateral optical fiber lens, wherein the fiber lens can be rotated by means of the accommodating pipe, and the position and the height of the fiber lens can be adjusted by means of the XZ movable platform, thereby changing the light-emitting direction of the fiber lens; then the light-emitting angle and the divergence angle are measured by utilizing the characteristics including high monochromaticity and high directivity of a laser, and positioning the point of projection of a light spot by means of the optical detection card and the optical power probe.

As for the measuring device for a lateral optical fiber lens provided herein and the measuring method using the same, since the light-emitting angle of the fiber lens does not change the characteristics with the edge length, the edge length at a far distance is measured, thereby reducing the influence of the measurement error on the calculation result, and further improving the measurement accuracy of the light-emitting angle and divergence angle of the lateral optical fiber lens; the measurement accuracy is further improved by means of measuring the size of a light spot using the optical power probe in cooperate with the XZ movable platform and the XY movable platform, and then according to the characteristics of the Gaussian beam and the relevant principles of geometrical optics, and the size of the light spot projection on the target detection surface is obtained, and then the divergence angle is calculated.

The measuring device of the present application is simple in structure, and the measuring method is simple and easy to implement, and can quickly measure the light-emitting angle and divergence angle of the lateral optical fiber lens; the high-cost instruments and equipment can be replaced by low-cost components, thereby ensuring good repeatability of the measurement within a certain allowable error range.

BRIEF DESCRIPTION OF THE DRAWINGS

The accompanying drawings are used for better understanding of the present application, and do not constitute an improper limitation of the present application; in which.

EXPLANATION OF REFERENCE SIGNS

Figure 1:
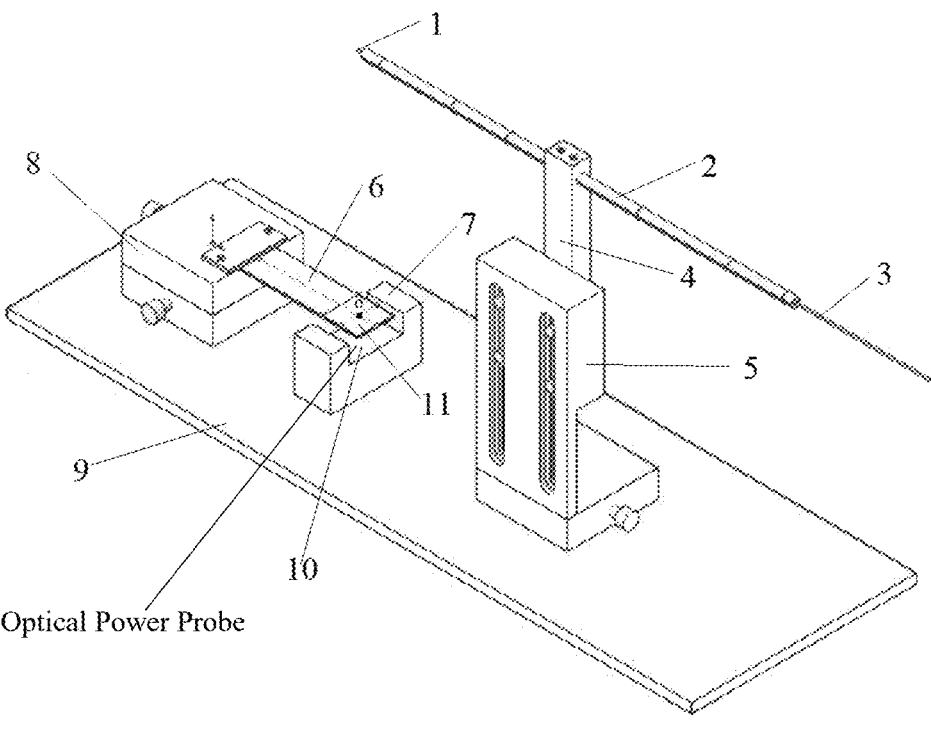
FIG. 1 is a schematic structural diagram of the measuring device for a lateral optical fiber lens provided by the present application.

1—fiber lens, 2—accommodating pipe body, 3—optical fiber, 4—lifting part, 5—control part, 6—optical detection card, 7—fixed base, 8—XY movable platform, 9—bottom plate, 10—slot, 11—square identification region.

DETAILED DESCRIPTION

The exemplary embodiments of the present application are described below, and various details of the embodiments of the present application are included to facilitate understanding, and they should be considered merely exemplary. Accordingly, those of ordinary skill in the art shall recognize that various changes and modifications can be made to the embodiments described herein without departing from the scope and spirit of the application. Also, descriptions of well-known functions and constructions are omitted in the following description for clarity and conciseness.

As shown in FIGS. 1-4, the present application provides a measuring device for a lateral optical fiber lens, comprising an XZ movable platform and an XY movable platform 8. A rotatable accommodating pipe 2 is arranged on the XZ movable platform, and an optical detection card 6 is arranged on the XY movable platform 8. An optical power probe is arranged below the optical detection card 6, the thickness of the optical detection card 6 is not more than 1 mm, and the distance from its lower surface to the detecting surface of the optical power probe is not more than 0.5 mm, in order to improve the measurement accuracy of the size of the light spot; and the height of the optical detection card 6 is less than that of the accommodating pipe 2, and the height difference range is limited to ensure that the size of the light spot projection of the light beam emitted by the fiber lens 1 on the optical detection card is greater than the stepping accuracy of the XZ movable platform and the XY movable platform and does not exceed the square area on the optical detection card. For example, the height difference may be 10-200 mm.

The optical fiber 3 to be tested can be placed in the accommodating pipe 2, and the end of the optical fiber 3 is provided with a lateral optical fiber lens 1; the optical fiber 3 runs through the accommodating pipe 2, and the fiber lens 1 extends out of the end of the accommodating pipe 2, and the fiber lens 1 is close to the XY movable platform 8.

In this application, the X-axis is on the straight line where the XZ movable platform, the optical detection card and the XY movable platform are located (the length direction of the bottom plate in FIG. 1), and the Y-axis is on a straight line perpendicular to the X axis, and the straight line is on the horizontal plane where the XZ movable platform and the XY movable platform are located (the width direction of the bottom plate in FIG. 1), the Z axis is on the straight line perpendicular to the plane formed by the X axis and the Y axis (the height direction of the XZ movable platform).

The XZ movable platform can drive the fiber lens 1 to move in the direction of the X-axis or the Z-axis.

The XY movable platform 8 can drive the optical detection card 6 to move in the direction of the X-axis or the Y-axis. The XY movable platform has a rotary knob with a scale for recording the relative distance that the optical detection card moves along the direction of the X-axis and/or the Y-axis.

The accommodating pipe 2 may be a hollow cylindrical, prismatic, truncated-conical, or truncated-prismatic pipe.

Each of the fiber lenses 1 in this application is a lateral optical fiber lens.

Both the XZ movable platform and the XY movable platform 8 are prior art, as long as the functions in this application can be realized.

A fixed base 7 is further arranged between the XZ movable platform and the XY movable platform 8, a slot 10 is arranged on the fixed base 7, and the optical power probe is arranged in the slot 10. A first end of the optical detection card 6 is fixed on the XY movable platform 8, and a second end of the optical detection card 6 is located above the slot 10. The optical detection card 6 is a rectangular sheet (thickness is also negligible), and a square identification region 11 exists at the second end of the optical detection card 6, and the square identification region 11 is located above the slot 10; the area of the square identification region 11 is not smaller than the area of the detecting surface of the optical power probe. Such a design can ensure that the optical detection card fully shields the light from reaching the power meter probe, so that the indicated reading of the power meter starts from the minimum random value, thereby improving the measurement accuracy of the size of the light spot projection.

The XZ movable platform comprises a fixed part, a control part 5 and a lifting part 4, and the control part 5 is fixed on the fixed part, and the lifting part 4 is retractable and arranged on the control part 5. The lifting part 4 is provided with a scale along the Z axis for recording the lifting or descending height of the lifting part 4. A through hole is provided at the top of the lifting part 4, the accommodating pipe 2 passes through the through hole, and the accommodating pipe 2 is perpendicular to the lifting part 4. The inner diameter of the through hole is larger than the outer diameter of the accommodating pipe 2. The accommodating pipe 2 can rotate in the through hole, so as to drive the optical fiber 3 to rotate, thereby changing the light-emitting direction of the optical fiber lens 1.

The lifting part 4 is further provided with a locking part for locking the accommodating pipe 2, after the light-emitting direction of the fiber lens 1 is adjusted, the accommodating pipe 2 can be locked by the locking part, so as to fix the light-emitting direction of the fiber lens 1.

The measuring device also comprises a bottom plate 9 on which the XZ movable platform, the XY movable platform 8 and the fixed base 7 are located. The bottom plate 9 is provided with a scale for recording the moving distances of the XZ movable platform and the XY movable platform 8 on the bottom plate 9. The shape of the bottom plate 9 can be rectangular, and scales are provided on the four sides of the rectangular plate, so as to record the moving distance.

As for the measuring device for a lateral optical fiber lens provided by the present application, when in use, firstly the measuring device is initialized, and the initialization state of the device is as follows: the optical fiber 3 is placed in the accommodating pipe 2, the fiber lens 1 is facing the XY movable platform 8; the projection of the optical fiber 3 on the optical detection card 6 coincides with the axial direction of the optical detection card 6, and the projection of the fiber lens 1 on the optical detection card 6 is located at the center O of the square identification region 11. Then, the fiber lens 1 is driven to rotate by rotating the accommodating pipe 2, and the position and height of the fiber lens 1 can be adjusted by adjusting the XZ movable platform, thereby changing the light-emitting direction of the fiber lens 1; and the optical detection card 6 is driven to move in the direction where the X-axis or Y-axis is located by adjusting the XY movable platform 8. Then, the light-emitting angle and the divergence angle are measured by utilizing the characteristics including high monochromaticity and high directivity of a laser, and positioning the projection point of a light spot by means of the optical detection card 6 and the optical power probe.

As for the measuring device for a lateral optical fiber lens provided herein, since the light-emitting angle of the fiber lens 1 does not change the characteristics with the edge length, the measurement of the edge length at a far distance may reduce the influence of the measurement error on the calculation result, and further improve the measurement accuracy of the light-emitting angle and divergence angle of the lateral optical fiber lens; the measurement accuracy is further improved by means of measuring the size of a light spot using the optical power probe in cooperate with the XZ movable platform and the XY movable platform 8, and then according to the characteristics of the Gaussian beam and the relevant principles of geometrical optics, and the size of the light spot projection on the target detection surface is obtained, and then the divergence angle is calculated.

Figure 2:
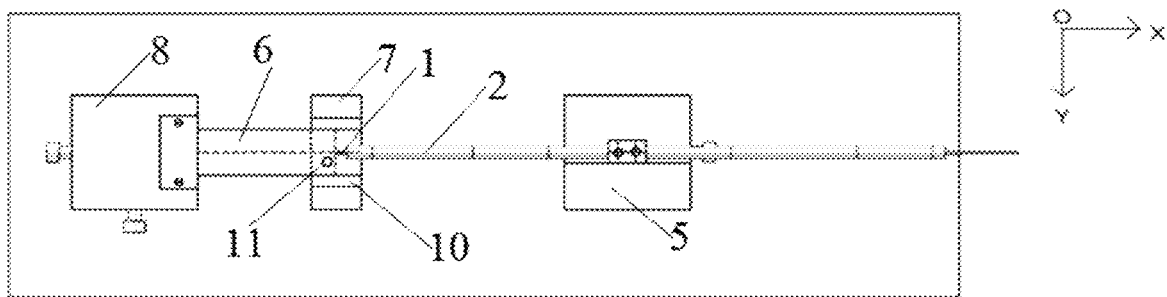
FIG. 2 is a top view of the measuring device for a lateral optical fiber lens provided by the present application after initialization.
Figure 3:
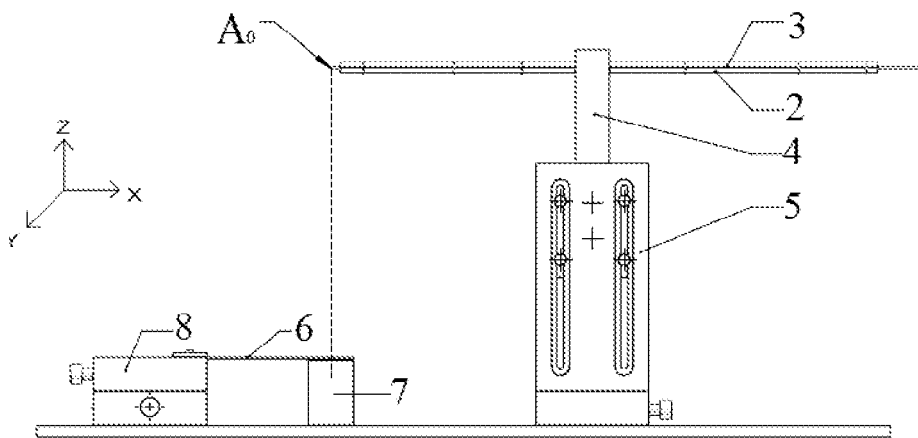
FIG. 3 is a front view of the measuring device for a lateral optical fiber lens provided by the present application after initialization.
Figure 4:
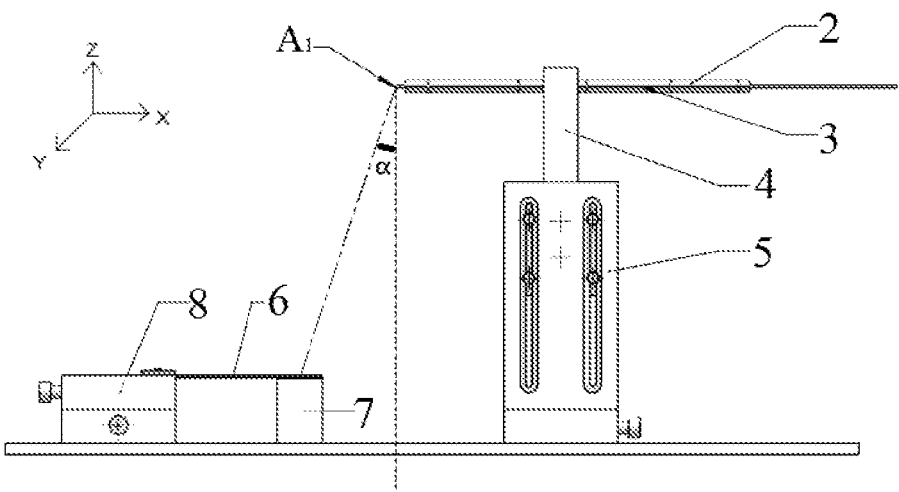
FIG. 4 is a schematic structural diagram during use of the measuring device for a lateral optical fiber lens provided by the present application.

The first measurement method for measuring the light-emitting angle of a lateral optical fiber lens provided by the present application comprises the following steps:

step 1: initializing the measuring device (as shown in FIG. 2 and FIG. 3), wherein the initial position of the center of the fiber lens is $A_0$ (0, 0, $Z_0$);

step 2: adjusting the XZ movable platform and/or the accommodating pipe to drive the fiber lens to move and/or rotate until the projection of the fiber lens on the optical detection card does not exceed the square identification region, and when the center of the light spot projection on the optical detection card is located at the center O of the square identification region (as shown in FIG. 4), the adjustment of the XZ movable platform and/or accommodating pipe is stopped, and at this time the position of the fiber lens is $A_1$ ($X_1$, 0, $Z_1$); and step 3: calculating the light-emitting angle ($\alpha$) of the fiber lens, $\alpha = \arctan (X_1/Z_1)|$.

In this application, as for initializing the measuring device, the optical fiber is arranged in the accommodating pipe, the fiber lens is facing the XY movable platform, and the projection of the fiber lens on the optical detection card is located at the center O of the square identification region, and the coordinates of O are (0, 0, 0).

The first measurement method for measuring the divergence angle of a lateral optical fiber lens provided by the present application comprises the following steps:

step 1: initializing the measuring device, wherein the initial position of the center of the fiber lens is $A_0$ (0, 0, $Z_0$);

step 2: adjusting the XZ movable platform and/or the accommodating pipe to drive the fiber lens to move and/or rotate until the projection of the fiber lens on the optical detection card does not exceed the square identification region, and when the center of the light spot projection on the optical detection card is located at the center O of the square identification region, the adjustment of the XZ movable platform and/or accommodating pipe is stopped, and at this time the position of the fiber lens is $A_1$ ($X_1$, 0, $Z_1$);

step 3: adjusting the XY movable platform to drive the optical detection card to move along the first direction of the X axis, and observing the change of the indicated reading P of the optical power probe, when P reaches the maximum value $P_1$, the coordinates of O at this time ($X_2$, 0, 0) are recorded;

step 4: adjusting the XY movable platform to drive the optical detection card to move along the second direction of the X axis, and observing the change of the indicated reading P of the optical power probe, when P reaches 0.5 $P_1$, the coordinates of O at this time ($X_3$, 0, 0) are recorded;

step 5: initializing the measuring device;

step 6: adjusting the XY movable platform to drive the optical detection card to move along the first direction of the Y axis, and observing the change of the indicated reading P of the optical power probe, when P reaches the maximum value $P_1$, the coordinates of O at this time (0, $Y_2$, 0) are recorded;

step 7: adjusting the XY movable platform to drive the optical detection card to move along the second direction of the Y axis, and observing the change of the indicated reading P of the optical power probe, when P reaches 0.5 $P_1$, the coordinates of O at this time (0, $Y_3$, 0) are recorded; and step 8: calculating the divergence angle of the fiber lens:

$$\text{divergence angle } (OX)\ \beta \approx 2 \times \arctan\ [(\delta_x \times \cos\ \alpha)/\delta_L];$$

$$\text{divergence angle } (OY)\ \gamma = 2 \times \arctan\ [(\delta_y/\delta_L];$$

wherein, $\delta_x = |X_2 - X_3|$, $\delta_y = |Y_2 - Y_3|$, $\alpha = |\arctan\ (X_1/Z_1)|$, and $\delta_L = Z_1/\cos\ \alpha$.

The beam divergence is actually irregular. Herein, only two special divergence angle components of the ZOX normal vector direction and the ZOX normal vector direction are taken as the research subjects.

The second measurement method for measuring the divergence angle of a lateral optical fiber lens provided by the application comprises the following steps:

step 1: initializing the measuring device, wherein the initial position of the center of the fiber lens is $A_0$ (0, 0, $Z_0$);

step 2: adjusting the XZ movable platform and/or the accommodating pipe to drive the fiber lens to move and/or rotate until the projection of the fiber lens on the optical detection card does not exceed the square identification region, and when the center of the light spot projection on the optical detection card is located at the center O of the square identification region, the adjustment of the XZ movable platform and/or accommodating pipe is stopped, and at this time the position of the fiber lens is $A_1(X_1, 0, Z_1)$;

step 3: adjusting the XY movable platform to drive the optical detection card to move along the first direction of the X axis, and observing the change of the indicated reading P of the optical power probe, when P reaches the maximum value $P_1$, the coordinates of O at this time ($X_2$, 0, 0) are recorded;

step 4: adjusting the XY movable platform to drive the optical detection card to move along the second direction of the X axis, and observing the change of the indicated reading P of the optical power probe, when P reaches 0.5 $P_1$, the coordinates of O at this time ($X_3$, 0, 0) are recorded;

step 5: initializing the measuring device;

step 6: adjusting the XY movable platform to drive the optical detection card to move along the first direction of the Y axis, and observing the change of the indicated reading P of the optical power probe, when P reaches the maximum value $P_1$, the coordinates of O at this time (0, $Y_2$, 0) are recorded;

step 7: adjusting the XY movable platform to drive the optical detection card to move along the second direction of the Y axis, and observing the change of the indicated reading P of the optical power probe, when P reaches 0.5 $P_1$, the coordinates of O at this time (0, $Y_3$, 0) are recorded;

step 8: adjusting the XZ movable platform and/or the accommodating pipe to drive the fiber lens to move and/or rotate until the projection of the fiber lens on the optical detection card does not exceed the square identification region, and when the center of the light spot projection on the optical detection card is located at the center O of the square identification region, the adjustment of the XZ movable platform and/or accommodating pipe is stopped, and at this time the position of the fiber lens is $A_4$ ($X_4$, 0, $Z_4$);

step 9: adjusting the XY movable platform to drive the optical detection card to move along the first direction of the X axis, and observing the change of the indicated reading P of the optical power probe, when P reaches the maximum value $P_1$, the coordinates of O at this time ($X_5$, 0, 0) are recorded;

step 10: adjusting the XY movable platform to drive the optical detection card to move along the second direction of the X axis, and observing the change of the indicated reading P of the optical power probe, when P reaches 0.5 $P_1$, the coordinates of O at this time ($X_6$, 0, 0) are recorded;

step 11: initializing the measuring device;

step 12: adjusting the XY movable platform to drive the optical detection card to move along the first direction of the Y axis, and observing the change of the indicated reading P of the optical power probe, when P reaches the maximum value $P_1$, the coordinates of O at this time (0, $Y_5$, 0) are recorded;

step 13: adjusting the XY movable platform to drive the optical detection card to move along the second direction of the Y axis, and observing the change of the indicated reading P of the optical power probe, when P reaches 0.5 $P_1$, the coordinates of O at this time (0, $Y_6$, 0) are recorded;

step 14: calculating the divergence angle of the fiber lens:

$$\text{divergence angle } (OX)\ \beta \approx 2 \times \arctan\ [(|\delta_x - \Delta x| \times \cos\ \alpha)/\Delta d];$$

$$\text{divergence angle } (OY)\ \gamma = 2 \times \arctan\ [(|\delta_y - \Delta y|/\Delta d];$$

wherein $\delta_x = |X_2 - X_3|$, $\delta y = |Y_2 - Y_3|$, $\Delta x = |X_5 - X_6|$, $\Delta y = |Y_5 - Y_6|$, $\Delta z = |Z_1 - Z_4|$, $\Delta d = \Delta z/\cos\ \alpha$, $\alpha = |\arctan\ (X_4/Z_4)|$.

As for initializing the measuring device, the optical fiber is arranged in the accommodating pipe, the fiber lens is facing the XY movable platform, and the projection of the fiber lens on the optical detection card is located at the center O of the square identification region, and the coordinates of O are (0, 0, 0).

The first direction of the X-axis is a direction away from the XZ movable platform, that is, the first direction of the X-axis is the negative direction of the X-axis; the second direction of the X-axis is opposite to the first direction, that is, the second direction of the X-axis is the positive direction of the X-axis;

the first direction of the Y axis is the negative direction of the Y axis, and the second direction of the Y axis is the positive direction of the Y axis.

As for the first measurement method (a method involving one fiber lens position) for measuring the divergence angle, the operation is simple, and the error of the test system itself is directly comprised in the test data during calculation.

As for the second measurement method ((a method involving two fiber lens positions) for measuring the divergence angle, the difference value is calculated based on the test data after performing two independent repeated tests, the error of the test system itself can be offset to a certain extent theoretically.

Although the embodiments of the present application have been described above, the present application is not limited to the above specific embodiments and application fields; and the above specific embodiments are only illustrative, instructive, and not restrictive. Many variant forms of the above embodiments can be obtained by those skilled in the art under the enlightenment of this description without departing from the protection scope of the claims of the application, and all of these variant forms fall in the protection scope of the application.

The invention claimed is:

1. A measuring device for a lateral optical fiber lens, comprising an XZ movable platform and an XY movable platform; wherein a rotatable accommodating pipe is arranged on the XZ movable platform, an optical detection card is arranged on the XY movable platform, and an optical power probe is arranged below the optical detection card;

a height of the optical detection card is smaller than that of the accommodating pipe;

a fixed base is arranged between the XZ movable platform and the XY movable platform, a slot is arranged on the fixed base, and the optical power probe is arranged in the slot;

a first end of the optical detection card is fixed on the XY movable platform, and a second end of the optical detection card is located above the slot;

the XY movable platform has a rotary knob with a scale for recording a relative distance that the optical detection card moves along the X-axis direction and/or the Y-axis direction; and the optical detection card is a rectangular sheet, and a square identification region is located at the second end of the optical detection card and above the slot; and the area of the square identification region is not smaller than that of the detecting surface of the optical power probe.

2. The measuring device according to claim 1, wherein the XZ movable platform comprises a fixed part, a control part and a lifting part; the control part is fixed on the fixed part, and the lifting part is retractable and arranged on the control part.

3. The measuring device according to claim 2, wherein the lifting part is provided with a scale along the Z axis for recording the lifting height of the lifting part.

4. The measuring device according to claim 2, wherein a through hole is provided at the top of the lifting part, the accommodating pipe passes through the through hole, and the accommodating pipe is arranged vertically to the lifting part.

5. The measuring device according to claim 4, wherein the inner diameter of the through hole is larger than the outer diameter of the accommodating pipe.

6. The measuring device according to claim 4, wherein the lifting part is further provided with a locking part for locking the accommodating pipe.

7. The measuring device according to claim 1, further comprising a bottom plate, wherein the XZ movable platform, the XY movable platform and the fixed base are all located on the bottom plate.

8. The measuring device according to claim 7, wherein a scale is provided on the bottom plate for recording the relative distances of the XZ movable platform and the XY movable platform on the bottom plate.

9. A measurement method for measuring the light-emitting angle of a lateral optical fiber lens by a measuring device for a lateral optical fiber lens, comprising an XZ movable platform and an XY movable platform; wherein a rotatable accommodating pipe is arranged on the XZ movable platform, an optical detection card is arranged on the XY movable platform, and an optical power probe is arranged below the optical detection card; and a height of the optical detection card is smaller than that of the accommodating pipe;

wherein the measurement method comprises the steps of:

initializing the measuring device, wherein the initial position of the center of the fiber lens is $A_0$ (0, 0, $Z_0$);

adjusting the XZ movable platform and/or the accommodating pipe to drive the fiber lens to move and/or rotate until the projection of the fiber lens on the optical detection card does not exceed the square identification region, and when the center of the light spot projection on the optical detection card is located at the center O of the square identification region, the adjustment of the XZ movable platform and/or accommodating pipe is stopped, and at this time the position of the fiber lens is $A_1$ ($X_1$, 0, $Z_1$); and calculating the light-emitting angle ($\alpha$) of the fiber lens, $\alpha = |\arctan (X_1/Z_1)|$.

10. The measurement method according to claim 9, wherein as for initializing the measuring device, the optical fiber is arranged in the accommodating pipe, the fiber lens is facing the XY movable platform, and the projection of the fiber lens on the optical detection card is located at the center O of the square identification region, and the coordinates of O are (0, 0, 0).

11. A measurement method for measuring the divergence angle of a lateral optical fiber lens by a measuring device for a lateral optical fiber lens, comprising an XZ movable platform and an XY movable platform; wherein a rotatable accommodating pipe is arranged on the XZ movable platform, an optical detection card is arranged on the XY movable platform, and an optical power probe is arranged below the optical detection card; and a height of the optical detection card is smaller than that of the accommodating pipe;

wherein the measurement method comprises the steps of:

initializing the measuring device, wherein the initial position of the center of the fiber lens is $A_0$ (0, 0, $Z_0$);

adjusting the XZ movable platform and/or the accommodating pipe to drive the fiber lens to move and/or rotate until the projection of the fiber lens on the optical detection card does not exceed the square identification region, and when the center of the light spot projection on the optical detection card is located at the center O of the square identification region, the adjustment of the XZ movable platform and/or accommodating pipe is stopped, and at this time the position of the fiber lens is $A_1$ ($X_1$, 0, $Z_1$);

adjusting the XY movable platform to drive the optical detection card to move along the first direction of the X axis, and observing the change of the indicated reading P of the optical power probe, when P reaches the maximum value $P_1$, the coordinates of O at this time ($X_2$, 0, 0) are recorded;

adjusting the XY movable platform to drive the optical detection card to move along the second direction of the X axis, and observing the change of the indicated reading P of the optical power probe, when P reaches 0.5 $P_1$, the coordinates of O at this time ($X_3$, 0, 0) are recorded;

initializing the measuring device;

adjusting the XY movable platform to drive the optical detection card to move along the first direction of the Y axis, and observing the change of the indicated reading P of the optical power probe, when P reaches the maximum value $P_1$, the coordinates of O at this time (0, $Y_2$, 0) are recorded;

adjusting the XY movable platform to drive the optical detection card to move along the second direction of the Y axis, and observing the change of the indicated reading P of the optical power probe, when P reaches 0.5 $P_1$, the coordinates of O at this time (0, $Y_3$, 0) are recorded; and calculating the divergence angle of the fiber lens:

$$\text{divergence angle } (OX) \ \beta \approx 2 \times \arctan \left[ (\delta_x \times \cos \alpha)/\Delta_L \right];$$

$$\text{divergence angle } (OY) \ \gamma = 2 \times \arctan \left[ (\delta_y/\delta_L \right];$$

wherein, $\delta_x = |X_2 - X_3|$, $\delta_y = |Y_2 - Y_3|$, $\alpha = |\arctan (X_1/Z_1)|$, and $\delta_L = Z_1/\cos \alpha$.

12. A measurement method for measuring the divergence angle of a lateral optical fiber lens by a measuring device for a lateral optical fiber lens, comprising an XZ movable platform and an XY movable platform; wherein a rotatable accommodating pipe is arranged on the XZ movable platform, an optical detection card is arranged on the XY movable platform, and an optical power probe is arranged below the optical detection card; and a height of the optical detection card is smaller than that of the accommodating pipe;

wherein the measurement method comprises the steps of:

initializing the measuring device, wherein the initial position of the center of the fiber lens is $A_0$ (0, 0, $Z_0$);

adjusting the XZ movable platform and/or the accommodating pipe to drive the fiber lens to move and/or rotate until the projection of the fiber lens on the optical detection card does not exceed the square identification region, and when the center of the light spot projection on the optical detection card is located at the center O of the square identification region, the adjustment of the XZ movable platform and/or accommodating pipe is stopped, and at this time the position of the fiber lens is $A_1$ ($X_1$, 0, $Z_1$);

adjusting the XY movable platform to drive the optical detection card to move along the first direction of the X axis, and observing the change of the indicated reading P of the optical power probe, when P reaches the maximum value $P_1$, the coordinates of O at this time ($X_2$, 0, 0) are recorded;

adjusting the XY movable platform to drive the optical detection card to move along the second direction of the X axis, and observing the change of the indicated reading P of the optical power probe, when P reaches 0.5 $P_1$, the coordinates of O at this time ($X_3$, 0, 0) are recorded;

initializing the measuring device;

adjusting the XY movable platform to drive the optical detection card to move along the first direction of the Y axis, and observing the change of the indicated reading P of the optical power probe, when P reaches the maximum value $P_1$, the coordinates of O at this time (0, $Y_2$, 0) are recorded;

adjusting the XY movable platform to drive the optical detection card to move along the second direction of the Y axis, and observing the change of the indicated reading P of the optical power probe, when P reaches 0.5 $P_1$, the coordinates of O at this time (0, $Y_3$, 0) are recorded;

adjusting the XZ movable platform and/or the accommodating pipe to drive the fiber lens to move and/or rotate until the projection of the fiber lens on the optical detection card does not exceed the square identification region, and when the center of the light spot projection on the optical detection card is located at the center O of the square identification region, the adjustment of the XZ movable platform and/or accommodating pipe is stopped, and at this time the position of the fiber lens is $A_4$ ($X_4$, 0, $Z_4$);

adjusting the XY movable platform to drive the optical detection card to move along the first direction of the X axis, and observing the change of the indicated reading P of the optical power probe, when P reaches the maximum value $P_1$, the coordinates of O at this time ($X_5$, 0, 0) are recorded;

adjusting the XY movable platform to drive the optical detection card to move along the second direction of the X axis, and observing the change of the indicated reading P of the optical power probe, when P reaches 0.5 $P_1$, the coordinates of O at this time ($X_6$, 0, 0) are recorded;

initializing the measuring device;

adjusting the XY movable platform to drive the optical detection card to move along the first direction of the Y axis, and observing the change of the indicated reading P of the optical power probe, when P reaches the maximum value $P_1$, the coordinates of O at this time (0, $Y_5$, 0) are recorded;

adjusting the XY movable platform to drive the optical detection card to move along the second direction of the Y axis, and observing the change of the indicated reading P of the optical power probe, when P reaches 0.5 $P_1$, the coordinates of O at this time (0, $Y_6$, 0) are recorded; and calculating the divergence angle of the fiber lens:

$$\text{divergence angle } (OX) \ \beta \approx 2 \times \arctan \left[ (|\delta_x - \Delta x| \times \cos \alpha)/\Delta d \right];$$

$$\text{divergence angle } (OY) \ \gamma = 2 \times \arctan \left[ (|\delta_y - \Delta y|/\Delta d \right];$$

wherein $\delta x = |X_2 - X_3|$, $\delta_y = |Y_2 - Y_3|$, $\Delta x = |X_5 - X_6|$, $\Delta y = |Y_5 - Y_6|$, $\Delta z = |Z_1 - Z_4|$, $\Delta d = \Delta z/\cos \alpha$, $\alpha = |\arctan (X_4/Z_4)|$.

13. The measurement method according to claim 11, wherein as for initializing the measuring device, the optical fiber is arranged in the accommodating pipe, the fiber lens is facing the XY movable platform, and the projection of the fiber lens on the optical detection card is located at the center O of the square identification region, and the coordinates of O are (0, 0, 0).

14. The measurement method according to claim 11, wherein the first direction of the X-axis is a direction away from the XZ movable platform, that is, the first direction of the X-axis is the negative direction of the X-axis; the second direction of the X-axis is opposite to the first direction, that is, the second direction of the X-axis is the positive direction of the X-axis;

the first direction of the Y axis is the negative direction of the Y axis, and the second direction of the Y axis is the positive direction of the Y axis.

* * * * *